Aug. 25, 1931.   R. S. BLAIR   1,820,115
MAP CONSTRUCTION
Filed June 8, 1921   2 Sheets-Sheet 1
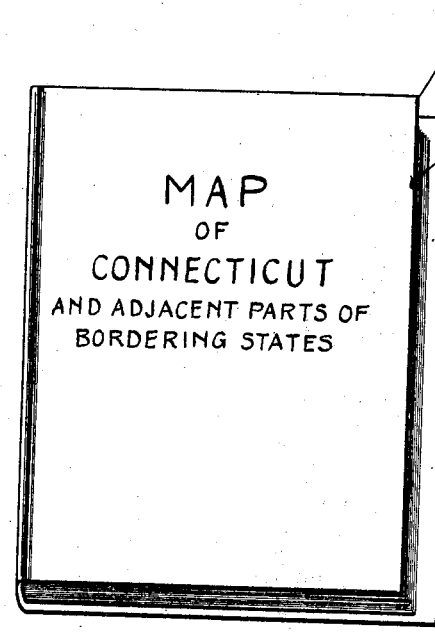
Fig. I
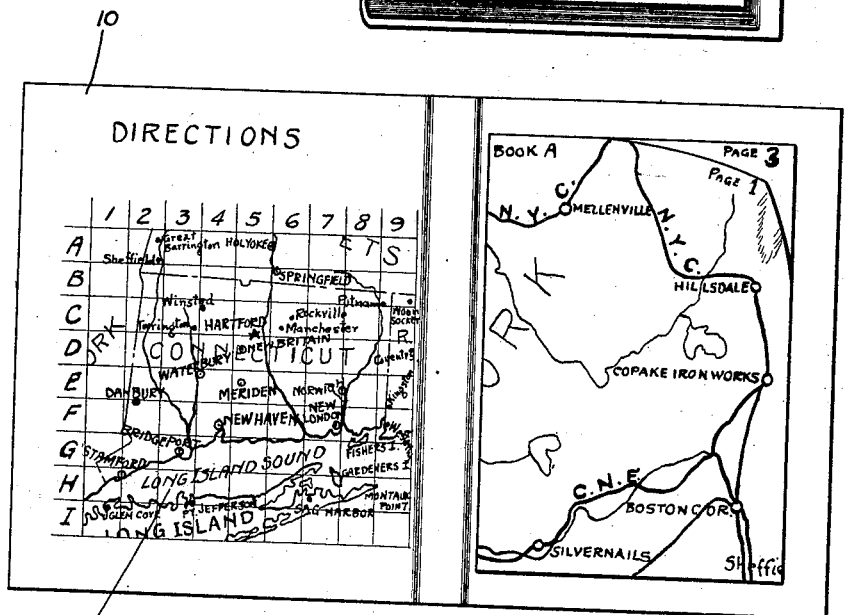
Fig. II
Fig. III
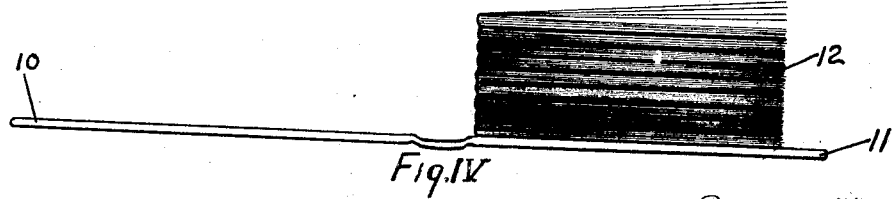
Fig. IV
INVENTOR
Robert S. Blair

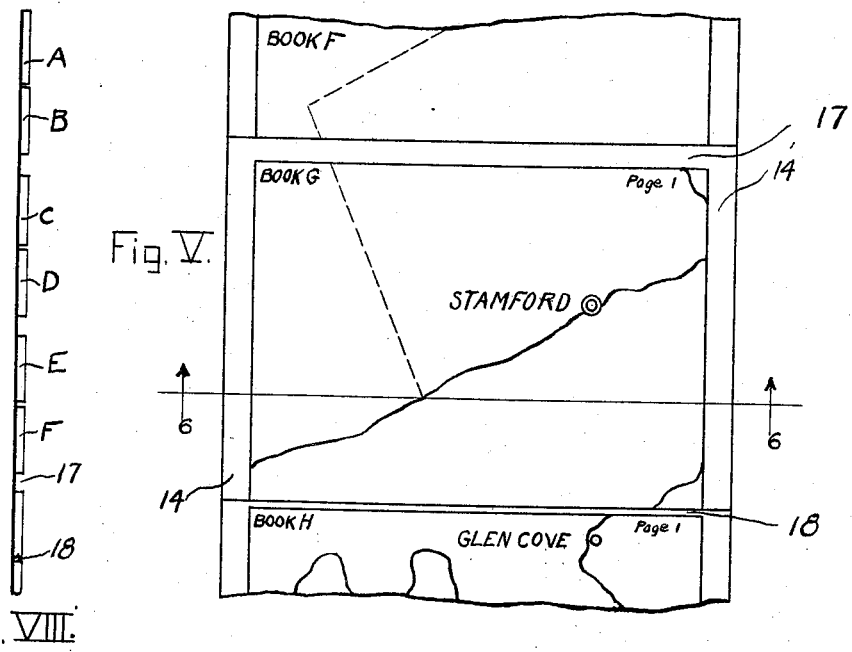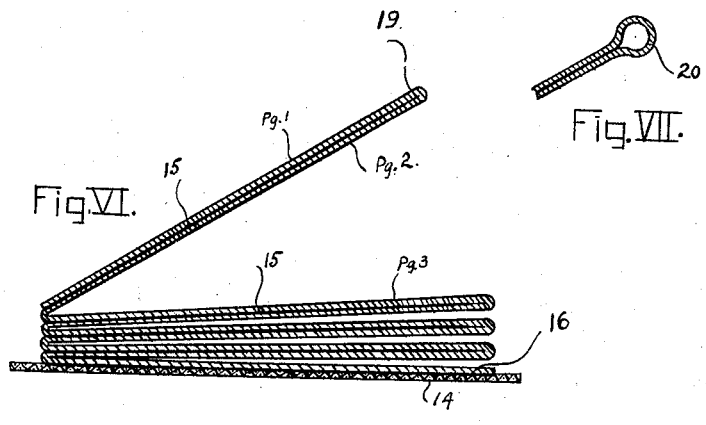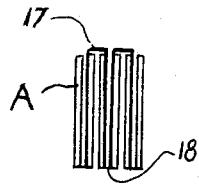

Patented Aug. 25, 1931

1,820,115

UNITED STATES PATENT OFFICE

ROBERT S. BLAIR, OF SOUND BEACH, CONNECTICUT

MAP CONSTRUCTION

Application filed June 8, 1921. Serial No. 475,947.

This invention relates to map construction and with regard to certain features to pocket maps.

One of the objects thereof is to provide a map construction simple in design and convenient to use. Another object is to provide a map suitable for use by motor tourists and aviators which may be conveniently examined while the vehicle in which the user is riding is in motion. Another object is to provide a map which will be unaffected by exposure to strong winds and yet show the territory described thereon in comparatively large scale. Another object is to provide a map construction which may be readily waterproofed without necessitating a cumbersome and unwieldy design. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings in which is shown one of the various possible embodiments of this invention, Figure I is a plan view of a map shown in folded form between two covers similar to the covers of a book;

Figure II is a plan view of the device shown in Fig. I, the upper cover being turned back exposing the inner side thereof and the first page of the map proper;

Figure III is a partial side elevation viewed from the right of Fig. II;

Figure IV is a front elevation of the map construction shown in Fig. II;

Figure V is a partial plan view of parts of the map proper shown in an extended position;

Figure VI is a transverse sectional view through the parts shown in Fig. V, the section being taken along the line 6—6 of that figure;

Figure VII is an enlarged detailed end view of the edge of a leaf in opened position;

Figure VIII is a diagrammatic edge view of the map in extended form; and

Figure IX is a similar view of the map arranged in its normal position.

Similar reference characters refer to similar parts throughout the several views of the drawings.

Referring now to the drawings in detail, in Fig. I there is shown a pair of covers 10 and 11 similar to the covers of a book, between which is positioned a map 12 folded up into a plurality of pages in a manner which will be hereinafter described. As will be seen in Fig. IV, the map 12 is attached to the inside of the rear cover 11 and is entirely free from the front cover 10 so that whenever the front cover 10 is turned over to the left exposing the map 12, the latter will remain undisturbed on the cover 11. Turning to Fig. II wherein the book shown in Fig. I is shown in open position so that its covers 10 and 11 lie flat with the backs resting on the plane of the drawings, the inner surface of the front cover 10 has drawn thereon in small scale a map 13 of the territory which the map 12 describes. The map 13 on the inside of the cover 10 is preferably made as large as is permitted within the boundaries of the cover 10 and includes all the territory shown in the pages of the folded map 12. As will be seen by an examination of the inside surface of the front cover 10, the map 13 drawn thereon is divided into a plurality of equal squares by a series of lines perpendicular to each other and spaced equidistant from each other running parallel to the edges of the front cover 10, there being provided a series of horizontal parallel lines which divide the map 13 up into nine horizontal parallel strips which in turn are divided up into squares of equal area by a series of parallel vertical lines intersecting them at right angles. The folded map 12 shows the same territory in enlarged scale as that shown in the map 13, there being a page in the book 12 for each of the squares into which the map 13 is divided. Referring to Fig. IV, the map 12 will be seen to be made up of a plurality of superimposed books. Returning now to Fig. II, each horizontal strip of the small scale map 13 is provided with a letter of the alphabet, there being nine consecutive letters used in the map 13, and each one of these letters and the horizontal strip of territory of the map 13 to which it refers covers the territory shown in one of the component books of the map 12. That is, each component book of the map 12 shows in enlarged scale the territory covered by one of the horizontal strips of the map 13 and the book is designated by the corresponding letter of the alphabet. Referring again to Fig. II, the vertical lines of the small map 13 divide the horizontal strips A, B, C, etc., into a plurality of squares, each square being provided with a numeral according with those shown at the top of the map 13. The strips of the map 12 forming the component books are correspondingly marked off into squares by corresponding vertical lines and the squares are given corresponding numbers. The component books A, B, C, etc., of the map 12 are then formed by folding the strips back and forth along the vertical boundary lines between the squares thus folding the squares back to back and cementing together the surfaces which do not have the map drawn thereon, as shown in Fig. VI. Referring to Fig. VI, and assuming that it is book A that is shown, the pages 1, 2, 3, etc., will be positioned as shown and each of these pages will show in enlarged scale the territory covered by the squares $A^1$, $A^2$, $A^3$, etc., of the small map 13. The cement is shown at 15 between the backs of pages 1 and 2, 3 and 4, etc. Since there are nine horizontal strips, namely, A to I, inclusive, shown on the small map 13, there will be nine component books in the map 12; and since each strip in map 13 is divided into nine sections, there will be nine pages in each book.

It is preferable that there be an uneven number of pages in each component book so that the back of the last page may be cemented to a connecting strip, preferably of fabric, which is indicated by the heavy line at 14 in Figs. III, VIII, and IX, and which is also shown in plan and cross-section, respectively, in Figs. V and VI. The strip 14 is cemented to the back of the last page, namely, page 9, as shown in Fig. VI as at 16, and extends transversely of the direction in which the leaves of the book swing. Each of the several books is in like manner cemented to this strip, as indicated in Fig. VII, and the lower edge of one book is opposite and closely adjacent the upper edge of the following book, with the parts extended as shown in Figs. VII and VIII. Preferably, however, the books follow one another in pairs more closely than the pairs are spaced one from another, or, in other words, book F is spaced as at 17 a greater distance from book G than is book G spaced as at 18 from book H. This permits the device more readily to be folded in the zigzag form shown in Fig. III of the drawings, in which it may be assumed that the first pair (at the left-hand of Fig. III) are books A and B folded back to back and thus permitting a closer joint at their connected edges than the connection between books B and C at the upper end of Fig. III in which the strip 14 must pass over these edges. It will be understood that this strip 14 has a zig-zag conformation and extends to any number of books, the arrangement being clearly indicated in the diagrammatic view of Fig. IX.

The entire map arranged as above described is mounted within the outer holder 10 as hereinbefore set forth.

It may be noted at this point that although the pairs of leaves of the individual books are cemented back to back, as indicated at 15, this cement is not carried entirely to the outer folded edge of the leaf thus formed. A part is left uncemented adjacent the fold, as indicated by the relatively thin line at 19. The purpose of this is to facilitate following the map from one page over to its continuation on the opposite side of the page by temporarily rounding or flattening the uncemented portion, as indicated at 20 in Fig. VII.

From the above it will be seen that there is provided a map 12 of such construction that it may be compactly folded up to resemble a book and protected by two heavy covers such as 10 and 11.

The use of the map described is substantially as follows: The user swings the upper cover 10 over to the left as shown in Figure II and picks out the square on the small scale map 13 drawn on the inner surface thereof, the section of the territory described by the large scale map 12 which the user wishes to examine. Let us consider that the user wishes to examine the territory surrounding the city of Meriden, turning to the small scale map 13 we find Meriden is located on page five of book E. The letter indicating the book is found at the left hand edge of the map while the page of the book is to be found at the upper edge of the map. Having determined the book and page which it is desired to consult, the user turns to the large scale map 12 and folding upward as a unit the books which he does not wish to consult, which in this case are A to D inclusive, page one of book E now being exposed it is only necessary to turn over the pages until the desired page, which is page five, is reached. In case the user is interested in the territory which bounds the edges of the territory shown on page five of book E it is only necessary to turn back to page four or to page six to examine the territory bounding on the left or right of that territory shown in page five, and by unfolding book D and book F so that page five of book D is immediately above page five of book E and page five of book F is immediately below, it is possible to examine the territory bounding above or below of that territory shown on page five book E. The above described construction makes possible the thorough waterproofing of the entire map by impregnation with paraffin, varnish or other transparent waterproofing material, the attendant stiffening up of the map due to the waterproofing does not diminish its usefulness and greatly increases its durability.

As various possible embodiments might be made of the above invention and as various changes might be made in the embodiment set forth, it is to be understood that all matter herein set forth or shown in the accompanying drawings is to be interpreted as illustrative and not in a limiting sense.

I claim:

1. A map folded along parallel lines in zigzag form and means holding the folds on one side together to form a hinge, the folds upon the opposite side being free and the portions of the map being unconnected one with another adjacent said free folds, whereby said folds may be temporarily flattened to connect visually the portions on opposite sides thereof.

2. A continuous map folded along parallel lines in zigzag form and means holding the folds of one side together to form a hinge, the folds upon the opposite side being free, and the portions of the map thus folded together being cemented back to back and being unconnected one with another adjacent said free folds, whereby said folds may be temporarily flattened to connect visually the portions on opposite sides thereof.

3. In a map or the like, in combination, a plurality of map sections showing parallel strips of the map each of said sections being formed into a book the pages of which depict in order a substantially continuous map surface, and relatively strong means connecting said sections directly one with another and forming hinges about which the sections swing toward and away from each other in a direction transverse to that in which their respective pages swing, said books being folded zigzag into superposed relation.

4. In a map or the like, in combination, a plurality of map sections comprising, respectively, parallel strips of the map each strip being formed into a book and relatively strong flexible means connecting corresponding pages of each of said books in their order and holding the edge of each book closely adjacent the edge of the next book in all positions thereof and forming hinges about which each book swings with respect to and fold upon the following book in a direction transverse to that in which its leaves swing, the books when folded alternately facing in opposite directions.

5. In a map or the like, in combination, a plurality of books respectively showing in substantially continuous form successive strips of a map surface, each of said books having binding means holding their pages together adjacent one edge, and means connecting said books in zigzag superposed relation whereby any two successive books may be held in the same plane and corresponding pages thereof simultaneously consulted.

6. In a map or the like, in combination, a plurality of books respectively showing in substantially continuous form successive strips of a map surface, each of said books having binding means holding their pages together adjacent one edge, means connecting said books in zigzag superposed relation whereby any two successive books may be held in the same plane and corresponding pages thereof simultaneously consulted, and an index map connected with said books having outlined thereon strips corresponding with the aggregate showing of each of said books and subdivisions of said strips corresponding with the individual pages of said books, said index map being marked to indicate the book and page to which each portion of its surface corresponds.

7. In a map or the like, in combination, a plurality of sections respectively formed of successive strips of a map and folded zigzag into pages, and means securing the pages thus formed one to another adjacent corresponding edges thereof to prevent extension of said strips, said sections being connected one to another at alternately opposite ends and being folded zigzag into superposed relation.

8. In a map or the like, in combination, a plurality of sections respectively formed of successive strips of a map and folded zigzag into pages, and means securing the pages thus formed one to another adjacent corresponding edges thereof to prevent extension of said strips, said sections being connected one to another at alternately opposite ends and being folded zigzag into superposed relation and the connection of said sections being directly between corresponding pages thereof.

9. In a map or the like, in combination, a plurality of books respectively showing in substantially continuous form successive strips of a map surface, each of said books having binding means holding their pages together adjacent one edge, and means connecting said books in zigzag superposed relation and forming hinges upon which any two successive books may be swung into the same plane and corresponding pages thereof simultaneously consulted, said connecting means between said books being alternately relatively wide and relatively narrow to facilitate a flat superposition thereof.

10. In a map or the like, in combination, a plurality of books each formed of a substantially continuous strip of a map folded zigzag into pages, means holding said pages together adjacent one edge to prevent extension of said strip, relatively strong flexible means connecting said books one with another at alternately opposite edges, said books being folded zigzag into superposed relation, and a cover member about said books and having thereon an index map the surface of which is marked to indicate the book and page corresponding to each portion of its area.

Signed at Stamford, in the county of Fairfield and State of Connecticut.

ROBERT S. BLAIR.